United States Patent [19]

Heward et al.

[11] Patent Number: 4,515,510
[45] Date of Patent: May 7, 1985

[54] SKIP TRAILER

[75] Inventors: Peter D. Heward, Islington via St. Germans, England; Valerie A. Jones; John C. Jones, both of Johannesburg, South Africa

[73] Assignee: Crowcroft Engineering Limited, Ipswich, England

[21] Appl. No.: 398,622

[22] Filed: Jul. 15, 1982

[30] Foreign Application Priority Data

Jul. 17, 1981 [GB] United Kingdom ............... 8122104

[51] Int. Cl.³ .............................................. B65G 65/23
[52] U.S. Cl. ...................................... 414/422; 414/12; 414/425; 414/500; 414/538
[58] Field of Search .............. 414/538, 559, 420, 421, 414/537, 482, 422, 425, 12

[56] References Cited

U.S. PATENT DOCUMENTS

| 2,659,504 | 11/1953 | Kranawetvogel et al. | 414/538 |
|---|---|---|---|
| 2,707,061 | 4/1955 | Legg | 414/500 |
| 3,138,272 | 6/1964 | Flowers | 414/537 |
| 3,155,249 | 11/1964 | Johnson | 414/538 |
| 3,703,244 | 11/1972 | Walsh et al. | 414/500 |
| 3,861,547 | 1/1975 | Sink, Sr. | 414/420 |
| 3,891,106 | 6/1975 | Alcanzare | 414/420 |
| 3,968,892 | 7/1976 | Spors | 414/482 |
| 4,042,138 | 8/1977 | Arvidsson | 414/482 |

FOREIGN PATENT DOCUMENTS

| 324884 | 2/1930 | United Kingdom . |
|---|---|---|
| 495122 | 11/1938 | United Kingdom . |
| 892515 | 3/1962 | United Kingdom . |
| 1112315 | 5/1968 | United Kingdom . |
| 1389761 | 4/1975 | United Kingdom . |
| 1450586 | 9/1976 | United Kingdom . |
| 1577573 | 10/1980 | United Kingdom . |
| 1579540 | 11/1980 | United Kingdom . |
| 1586941 | 3/1981 | United Kingdom . |

Primary Examiner—Joseph E. Valenza
Assistant Examiner—Stuart J. Millman
Attorney, Agent, or Firm—Charles A. Brown; Charles E. Brown

[57] ABSTRACT

A trailer for towing by family saloon cars and the like has a wheeled frame (12) with a towing hitch (34) at the front. The frame has a respective ramp rail (22) at each side to enable a skip (14) to be drawn onto the frame, a support wheel (25) of the skip engaging on each rail. The skip can carry heavy bulk loads such as sand or bricks in the region of a ton which normal car trailers could not support. In addition, the mounting of the skip on the trailer frame by means of support wheels enables the skip to be pivoted in situ to tip out its load. Tipping, and mounting and demounting of the skip are effected using winch (16) supported on the frame near the towing hitch. The trailer also has a pivotable ramp (50) enabling the trailer to be used to carry heavy plant such as a cement mixer or roller.

12 Claims, 4 Drawing Figures

SKIP TRAILER

The present invention relates to trailers, particularly suitable for towing by the average family motor vehicle.

Trailers, typically capable of being towed by saloon cars and the like, although being of general purpose use do generally suffer from a number of disadvantages. The average vehicle trailer is not generally capable of supporting particularly heavy loads, for example in the region of a ton. In addition, where such trailers are used to carry bulk material such as sand, cement and aggregate and also loads such as stone blocks and bricks, unloading can be extremely tedious and time-consuming.

The present invention seeks to provide an improved form of trailer which can be towed by the average family saloon car.

Accordingly, the present invention provides a trailer for towing by a motorized vehicle, the trailer comprising a frame supported on a pair of wheels and having means for enabling a load to be mounted onto and demounted from the trailer, and means for assisting mounting and demounting of said load.

Preferably the trailer has a receptacle in the form of a skip for supporting the load on the frame, the skip being detachably mounted on the frame so as to be pivotable for discharging the load. The assisting means is operable for pivoting the receptacle.

The means for enabling mounting and dismounting of the load advantageously comprises respective ramp means at each side of the frame for engaging beneath respective bearing surfaces of the skip and enabling the skip to be drawn onto the frame by the assisting means. The ramp means are conveniently formed by rails with the bearing surfaces being formed by respective support wheels on the skip.

Alternatively, the means for enabling mounting and demounting of the load comprises a ramp which is pivotable between two extreme positions, the first being a lowered, operative position and the second being a folded, inoperative position. Locking means are provided for locking the ramp in a substantially horizontal attitude intermediate the extreme positions to enable the ramp to support a load such as a cement mixer or roller during towing of the trailer.

Preferably the assisting means is a winch which is manually or electrically operable.

A trailer according to the present invention enables a family motor vehicle to tow loads heavier than those which can be accommodated by normal family vehicle trailers.

The present invention is further described hereinafter, by way of example, with reference to the accompanying drawings, in which.

Figure 1:
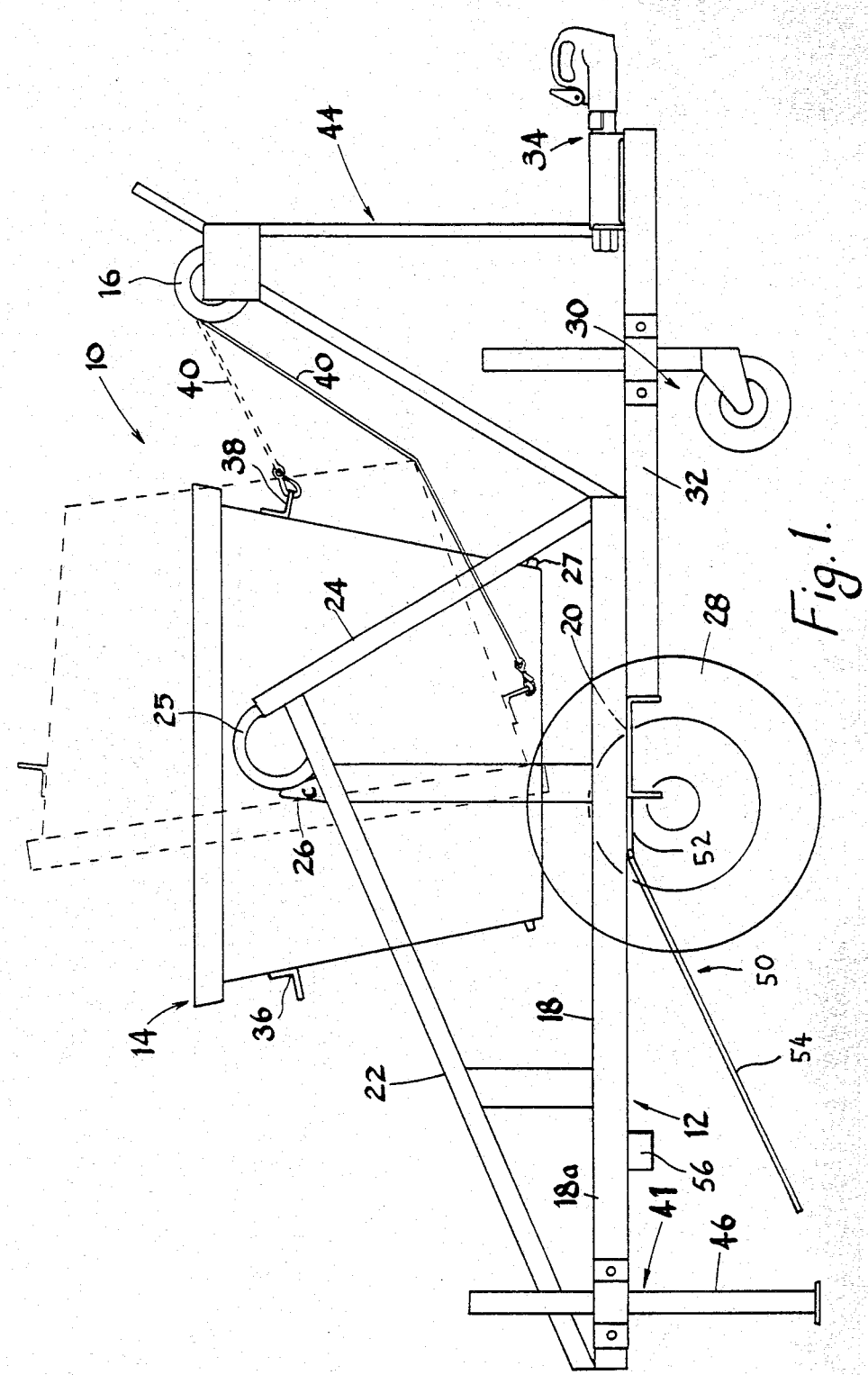
FIG. 1 is a side elevation of a preferred embodiment of trailer according to the present invention.
Figure 2:
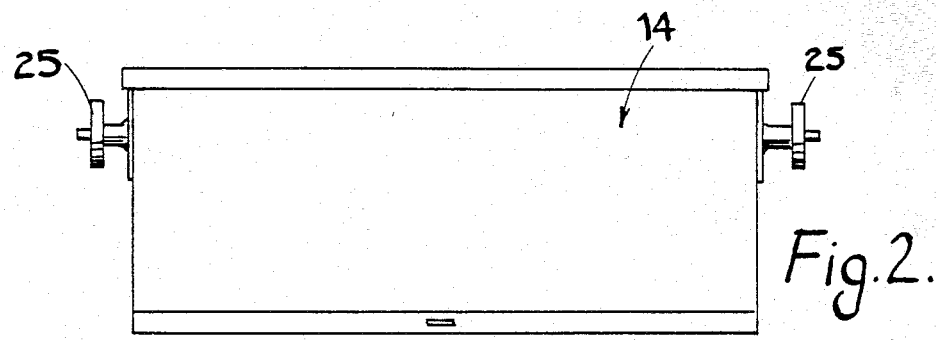
FIG. 2 is an elevation of the receptacle of the trailer viewed in the direction of arrow 'A' of FIG. 1.
Figure 3:
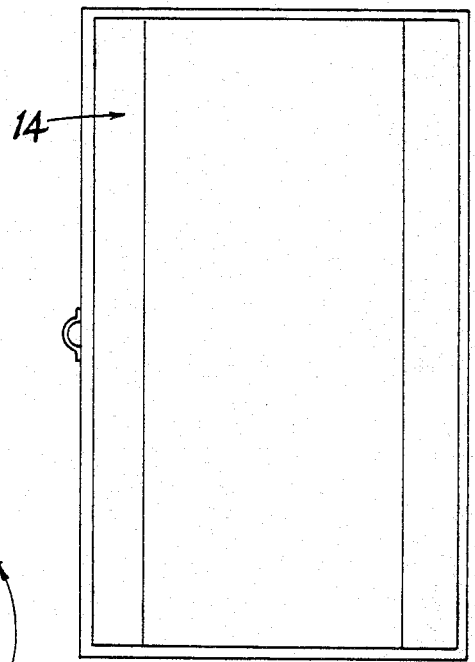
FIG. 3 is a plan view of the body of the trailer.

The drawings show a trailer 10 which is suitable for towing by the average family motor vehicle and comprises a frame 12 which pivotably supports a receptacle 14 in the form of a skip. The skip 14 is coupled to a winch 16 on the frame 12, the winch being actuable to pivot the skip 14 about its pivot axis to unload the contents of the skip.

The frame 12 comprises two substantially parallel and horizontally orientated elongate base members 18 which are rigidly interconnected by cross members 20 (only one of which is shown in the drawings). The cross-members are positioned relative to the base members 18 so as to leave one end portion 18a (the left-hand end portion of the cross-members as seen in FIG. 1) free of cross-members for reasons given below. Each base member 18 is also rigidly connected with two struts 22, 24 to form a triangular side frame lying in a substantially vertical plane. Each strut 22 is somewhat longer than the associated strut 24 and is connected to the rear end of the associated base member 18, i.e., that end of the trailer remote from the towing end. Each strut 22 is in the form of a rail, preferably made of U-cross-section channelling which engages with a respective support wheel 24 of the skip 14.

The skip 14 is of elongate, box-like form with the two support wheels 25 being rotatably mounted on a common axis, a respective one of the support wheels 25 being mounted adjacent to the upper edge of each end of the skip. FIG. 1 shows the skip mounted on the frame 12 with the support wheels 25 engaged on the rails 22 at the elevated ends thereof, the skip being retained in position by suitable chocks or wedges 26 or locking pins or bolts which engage with the rails 22.

The frame 12 is supported on two road wheels 28 which are mounted directly on the frame 12 or by way of suitable resilient mountings and a further, jockey wheel 30 is secured to a V-shaped towing frame 32 which is in turn secured to the cross-members 20. The vertical position of the jockey wheel 30 is adjustable. In addition, the towing frame also carries a towing hitch 34 at its apex.

The skip 14 has two brackets 36 and 38 secured to the upper regions of the respective sides of the skip 14. In normal use a cable 40 of the winch 16 is detachably connected to the bracket 36 with the cable 40 passing underneath the skip 14. The winch itself is supported at approximately the height of the lip of the skip on a framework 44 secured adjacent the towing hitch 34. The winch 16 is conveniently a reversible ratchet manually operated winch although a motorized drive may be provided. The winch drum is perferably coupled to its drive handle or drive motor through gears to provide a mechanical advantage, thus reducing the necessary operating force.

The winch drum is connected to the cable 40 such that, depending on the direction of rotation of the winch drum, the cable 40 is wound onto the drum or paid out. As will be appreciated from FIG. 1, if the winch 16 is actuated to wind in cable 40 the skip 14 will pivot about its support wheels 25 in an anticlockwise direction towards the attitude shown in dotted lines in FIG. 1 to tip out the contents of the skip. Reversal of the direction of rotation of the winch drum allows the skip to return to its rest position under control of the cable 40 as it is paid out, since the positioning of the support wheels 25 on the skip 14 is such as to ensure that the stable position of the skip is as shown in solid lines in FIG. 1 with the skip centre of gravity vertically below the wheel rotational axis. To provide additional stability during tipping, each base member 18 is provided with a respective stand 41 adjacent to the left-hand end of the frame 12, the stand having a leg 46 whose height is adjustable and which is retracted during towing.

As is mentioned above, the support wheels 25 of the skip 14 ride on the parallel rails 22 and the provision of the rails 22 is simply to enable the skip to be mounted onto and demounted from the frame 12. In order to demount the skip the legs 46 of the stands 44 are fully retracted and the cable 40 connected to the bracket 38 (as shown in dotted lines). Any slack in the cable is then taken up by the winch 16 and the chocks 26 removed. The winch 16 is then actuated to pay out the cable, thus allowing the skip 14 to ride down the rails 22 towards the left-hand end of the frame 12. The weight of the skip 14 will tilt the frame 12 about the pivot axis of the road wheels 28 bringing the left-hand end of the frame as seen in FIG. 1 in contact with the ground, if the frame has not already been pivoted into this attitude. The legs 46 of the stands 44 need not, of course, be retracted if they are already extended, since the skip 14 can be lowered along the rails 22 until it rests on the ground and the frame 18 then drawn forward clear of the skip after the cable 42 has been detached from the bracket 38.

Mounting of the skip 14 is the reverse of the above procedure with the skip 14 being drawn into the illustrated position by the winch 16 after which the chocks 26 are placed in position and the cable 40 is attached to the bracket 36.

Locking bolts 27 may also be provided on the frame to lock the adjacent base of the receptacle in position.

The major advantage of a trailer according to the present invention is that, while being suitable for towing by a motor car, it is capable of carrying heavy loads which can be tipped from the trailer by one operator in a very simple maneuver and a very short time.

Figure 4:
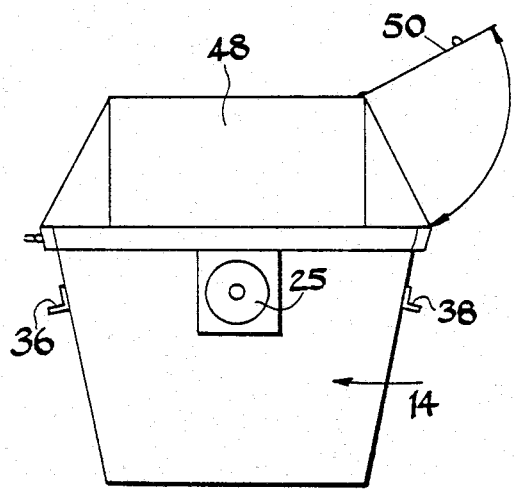
FIG. 4 is a side elevation of the receptacle provided with a cover.

FIG. 4 shows the skip 14 provided with a cover 48 having a hinged lid 50 at one side.

In the illustrated trailer the base members 18 are bridged by a base platform 50 comprising a front half 52 which is rigidly secured to the base members 18 and extends from adjacent wheels to the front end of the base members 18 adjacent the jockey wheel 30, and a rear half 54 hinged to the front half and forming a ramp. The base platform allows heavy plant items such as concrete mixers and rollers to be carried by the trailer. For loading and unloading, the ramp 54 is lowered and the plant runs up or down the ramp with the assistance of the winch 16. The ramp can be retained horizontally, coplanar with the front half, utilizing locking means 56 such as heavy duty shoot bolts and can be hinged back onto the front half to allow the trailer to be used with a skip.

We claim:

1. A trailer for towing by motorized vehicle, the trailer comprising:
   a frame;
   a pair of road wheels mounted on said frame;
   a receptacle for receiving a load being pivotably mountable on the frame; said receptacle having respective spaced apart bearing surfaces for supporting said receptacle on the frame;
   means for enabling said receptacle to be mounted onto and demounted from the trailer comprising respective ramp means fixedly mounted on said frame at each side of said frame for engaging beneath said respective bearing surfaces and enabling said receptacle to be lifted and drawn onto said frame to a position wherein said receptacle is fully supported by said frame, and lowered from said frame;
   and means connectible to a first position on said receptacle for assisting mounting and demounting of said receptacle and connectible to a second position on said receptacle for enabling said assisting means to pivot said receptacle relative to said ramp for discharging said load therefrom.

2. A trailer as claimed in claim 1 wherein each said bearing surface is formed by a respective support wheel on said receptacle.

3. A trailer as claimed in claim 1 further comprising a pivotable ramp mounted on said frame and pivotable between a lowered, operative position for enabling mounting and demounting of further wheeled loads and an upper inoperative position and said frame further comprises means for locking said pivotable ramp in a substantially horizontal attitude intermediate said positions for supporting said further wheeled loads during towing of the trailer.

4. A trailer as claimed in claim 2 further comprising a pivotal ramp mounted on said frame and pivotable between a lowered, operative position for enabling mounting and demounting of further wheeled loads and an upper inoperative position and said frame further comprises means for locking said pivotal ramp in a substantially horizontal attitude intermediate said positions for supporting said further wheeled loads during towing of the trailer.

5. A trailer as claimed in claim 1 wherein said assisting means is a manually operable winch.

6. A trailer as claimed in claim 1 wherein said assisting means is an electrically operable winch.

7. A trailer as claimed in claim 3 wherein said assisting means is a manually operable winch.

8. A trailer as claimed in claim 3 wherein said assisting means is an electrically operable winch.

9. A trailer as claimed in claim 2 wherein said assisting means is a manually operable winch.

10. A trailer as claimed in claim 2 wherein said assisting means is an electrically operable winch.

11. A trailer as claimed in claim 4 wherein said assisting means is a manually operable winch.

12. A trailer as claimed in claim 4 wherein said assisting means is an electrically operable winch.

* * * * *